(12) United States Patent
Schulze Wartenhorst et al.

(10) Patent No.: US 8,464,656 B2
(45) Date of Patent: Jun. 18, 2013

(54) MILKING CUP AND MILKING METHOD

(75) Inventors: Bernhard Schulze Wartenhorst, Warendorf (DE); Reinhard Frenser, Rheda-Wiedenbrück (DE)

(73) Assignee: GEA Farm Technologies GmbH, Bönen (DE)

( * ) Notice: Subject to any disclaimer, the term of this patent is extended or adjusted under 35 U.S.C. 154(b) by 0 days.

(21) Appl. No.: 12/085,421

(22) PCT Filed: Nov. 21, 2006

(86) PCT No.: PCT/EP2006/011132
§ 371 (c)(1),
(2), (4) Date: Sep. 18, 2008

(87) PCT Pub. No.: WO2007/059915
PCT Pub. Date: May 31, 2007

(65) Prior Publication Data
US 2009/0151641 A1 Jun. 18, 2009

(30) Foreign Application Priority Data
Nov. 22, 2005 (DE) .................... 10 2005 055 973

(51) Int. Cl.
*A01J 5/04* (2006.01)
(52) U.S. Cl.
USPC ............... 119/14.52; 119/14.49; 119/14.02
(58) Field of Classification Search
USPC .................. 119/14.47, 14.5, 14.52, 14.53
See application file for complete search history.

(56) References Cited

U.S. PATENT DOCUMENTS

| | | | | |
|---|---|---|---|---|
| 1,365,665 | A * | 1/1921 | Davies | 119/14.51 |
| 1,846,243 | A * | 2/1932 | Ashton | 119/14.53 |
| 2,612,136 | A | 9/1952 | Davis | |
| 4,249,481 | A * | 2/1981 | Adams | 119/14.02 |
| 6,435,132 | B1 * | 8/2002 | Milbrath et al. | 119/14.47 |
| 6,439,156 | B1 * | 8/2002 | Fleischman | 119/14.33 |
| 6,546,893 | B1 * | 4/2003 | Happel et al. | 119/14.47 |
| 6,997,136 | B1 | 2/2006 | Coates | |

FOREIGN PATENT DOCUMENTS

| | | |
|---|---|---|
| DE | 198 40 732 A1 | 3/2000 |
| DE | 19840732 A1 * | 3/2000 |
| EP | 1 239 725 A1 | 3/2004 |
| EP | 1 647 183 A2 | 4/2006 |
| FR | 499796 | 2/1920 |
| FR | 2 413 850 | 7/1979 |
| FR | 2413850 A * | 8/1979 |

OTHER PUBLICATIONS

English language Abstract, Translated Description and Claims of DE 198 40 732 A1, European Patent Office's esp@cenet.com database, 5pp.
PCT/IB/338, Notification of Transmittal of Translation of the International Preliminary Report on Patentability received Aug. 4, 2008, 1p.
PCT/IB/373, International Preliminary Report on Patentability received Aug. 4, 2008, 1p.
PCT/ISA/237, Written Opinion of the International Searching Authority (Translation) received Aug. 4, 2008, 7pp.

* cited by examiner

*Primary Examiner* — Kimberly Berona
*Assistant Examiner* — Joshua Huson
(74) *Attorney, Agent, or Firm* — Smith Law Office

(57) ABSTRACT

A milking cup for milking animals, the milking cup having a liner arranged inside a housing to define a pulsation chamber therebetween. The pulsation chamber is divided into multiple compartments so that vacuum pulsation applied to the pulsation chamber compartments causes controlled collapse of the liner on an animal teat inserted therein.

26 Claims, 2 Drawing Sheets

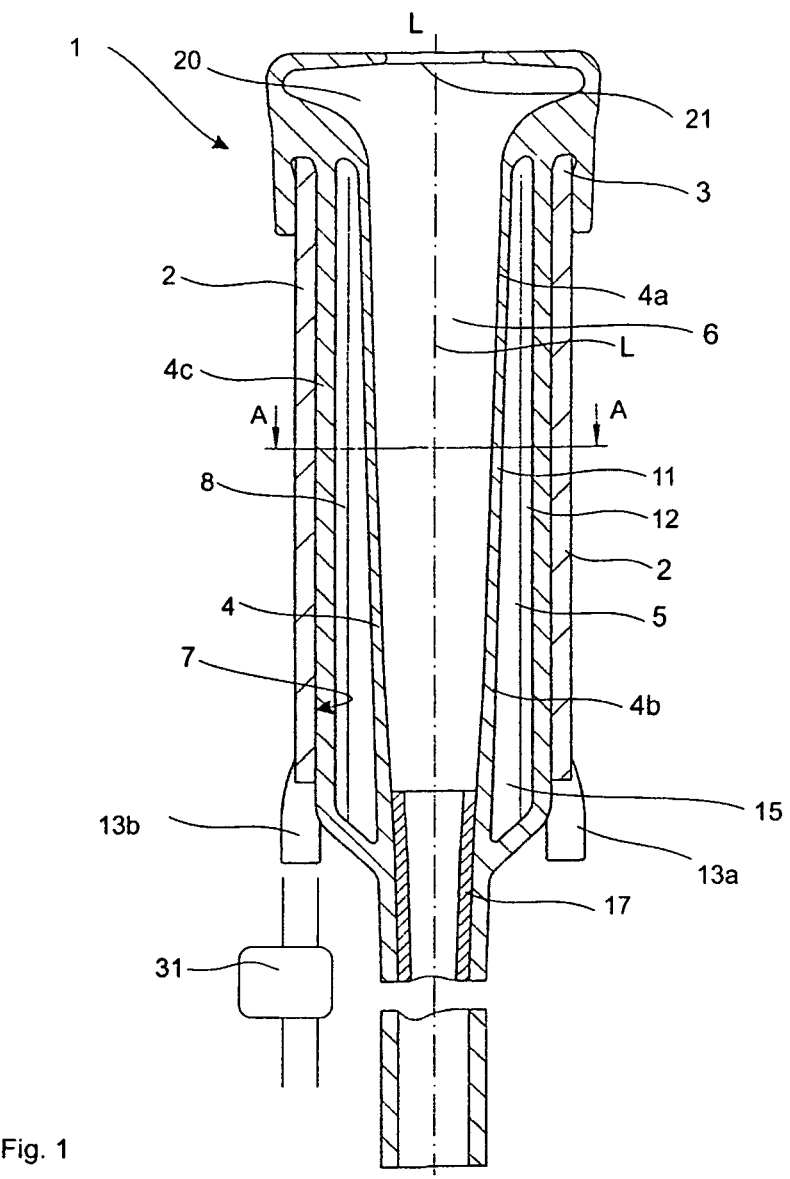
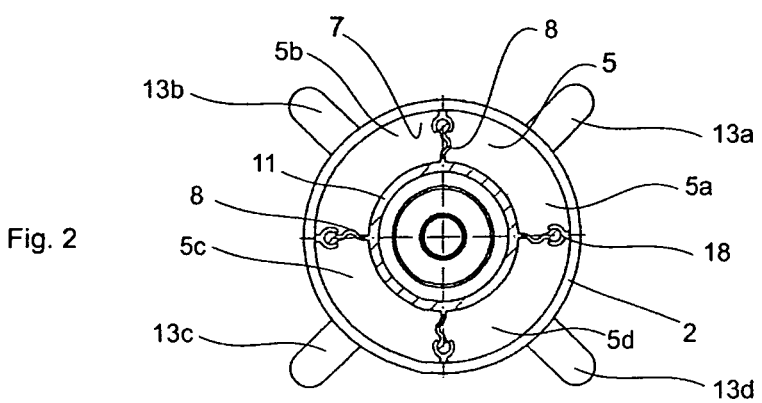
Fig. 1
Fig. 2

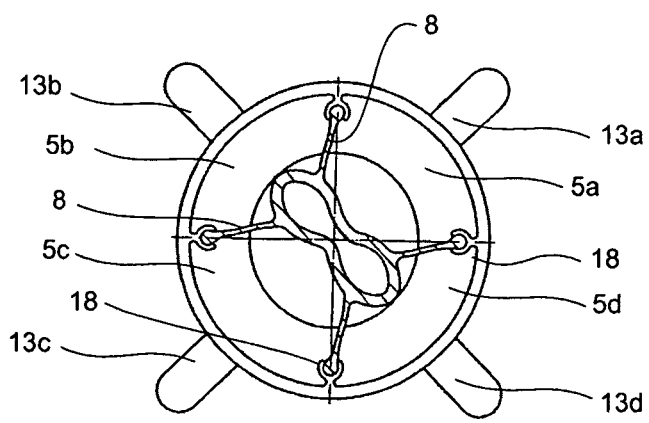
Fig. 3
Fig. 4
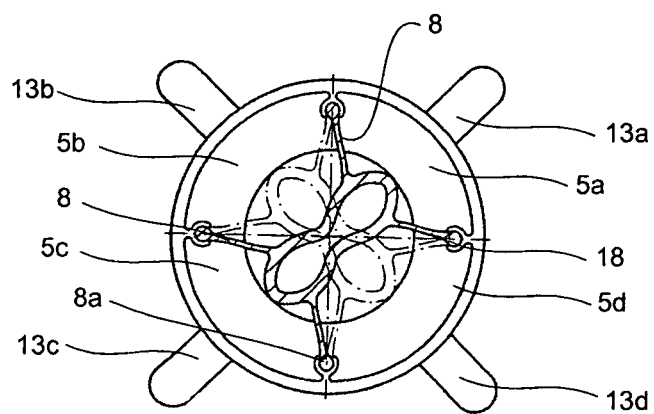

MILKING CUP AND MILKING METHOD

FIELD AND BACKGROUND OF THE INVENTION

The present invention relates to an apparatus and a device, and a method for milking animals. The invention will now be described in conjunction with an apparatus and a method for milking cows. It is pointed out though that the present invention may likewise be employed for milking apparatuses and milking methods for milking sheep, goats, buffaloes, camels, dromedaries, llamas, donkeys, yaks, elks, horses, and other lactating animals.

The invention may be employed in conventional milking, machine milking, and in semi-automatic milking. Application is also conceivable in systems where cleaning of the teats and/or placing the teat cups to the animal teats occurs semi-automatically, fully automatically, robot-assisted and/or computer-controlled. It is also possible to provide semi- or fully automatic pre- or post-treatment of the teats e.g. by means of a dipping agent. Milking may be performed by quarter or a milk collection piece may be provided to receive milk hoses leading off the teat cups.

For machine-milking the prior art provides the so-called two-chamber teat cup principle. According to this principle, a liner is inserted in a teat cup sleeve so as to form two separate chambers namely, for one a teat cup internal chamber in which the teat is located, and for another a teat cup gap between the liner and the outer sleeve of the teat cup. The teat cup gap is typically referred to as the pulsation chamber and the teat cup internal chamber, as the teat chamber.

As the teat cup is placed on a teat in milking, a controlled negative pressure is applied to the teat cup internal chamber. In this way adherence of the teat cup is ensured. Furthermore, by way of the pressure difference generated between the teat cup internal chamber and the teat cistern, milk is drawn out of the teat and discharged.

By way of a continually applied permanent vacuum, however, liquids might accumulate in the teat tissue and specifically in the region of the teat tip. Thus, the closing mechanism for the teat provided in this region should not be kept open over time, i.e. continually. For this reason the prior art employs a pulsator intended to periodically apply different pressures to the gap between the teat cup sleeve and the liner, e.g. a vacuum alternating with atmospheric pressure.

The existing pressure differences cause the liner in the internal chamber of the teat cup sleeve to collapse as the teat cup gap is ventilated such that the liner bears snug against the teat where it remains during the rest phase. During the subsequent evacuation the liner is lifted off the teat, releasing the milk flow path that had been substantially closed during the rest phase. For the entire duration of milking the liner will periodically open and close with the milk flowing out of the teat while the liner is open. By way of the liner contacting the teat the teat tip will be massaged and the tissue relieved. The tissue fluid stemmed in the teat can be guided back to upper regions and thus back to blood circulation.

For effective milking it is useful or necessary to first stimulate the teats. Typically, the pulsator is operated at a noticeably higher frequency in the initial milking phase for stimulating the teat, e.g. approximately 300 cycles per minute for cows, while for the main milking phase a frequency of e.g. approximately 60 cycles per minute is set. In some cases the pulsator settings are made highly different, varying the time settings for each pulsation phase.

Other embodiments provide for positive pressure to be employed for the pressure difference in the so-called rest phase to be still higher with the liner closed.

Another approach to stimulating the teats attempts to positively influence teat massage by means of a different design of the liner. As a rule the prior art employs rotationally symmetric liners. Also, liners are known which are not round in cross-section in the region surrounding the teat but comprise oval or polygon areas.

A teat cup is known from EP 1 239 725 B1. Said teat cup comprises a liner connected with the teat cup sleeve through various radial walls. In this way the pulsation chamber comprises multiple finger-like chamber portions all of which are connected with one another and overall form one large vacuum chamber.

In the embodiments known from the prior art of the two-chamber teat cup principle described above the collapsing direction of the liner is basically always the same. This means that with the same teat cups consistently placed on the same teats of the animals to be milked, the teats will always be submitted to pressure loads in the same spots. This holds in particular in automatic milking systems where teat cup placement occurs robot-assisted. In these systems, automatic teat cup placement with the relatively consistent grasping and placing technique may result in that the teat cups will always be positioned the same relative to each teat. It has been observed in automatic milking systems that the teats flatten in the direction of the pressure loads. Recent studies have shown that the teats which otherwise respond highly sensitive will not be responsive to any kind of stimulation after two thirds of the milking operation.

SUMMARY OF THE INVENTION

It is therefore the object of the present invention to provide a milking apparatus which allows improved massaging of the teats of the animals to be milked during the milking operation.

The apparatus according to the invention for milking animals comprises a housing and a suction element located inside said housing at least in part. A pulsation chamber is formed at the suction element substantially in the housing. Additionally at least one opening is associated to the pulsation chamber to extract a fluid from, or feed a fluid to, said pulsation chamber. According to the invention the pulsation chamber is subdivided into at least two separate pulsation compartments.

The apparatus according to the invention for milking animals comprises a housing and a suction element located inside said housing at least in part. A pulsation chamber and a teat chamber are formed at the suction element substantially in the housing. At least one opening associated to the pulsation chamber is provided to apply a fluid to the pulsation chamber, i.e. to extract a fluid from, or feed a fluid to, said pulsation chamber. According to the invention the pulsation chamber is subdivided into at least two pulsation compartments which are substantially, and in particular entirely, separate from one another.

The device according to the invention for milking animals comprises a suction element having an inner wall and an outer wall. At least one pulsation chamber and one teat chamber are formed at the suction element. At least one opening associated to the pulsation chamber is provided to apply a fluid to said pulsation chamber. The pulsation chamber is subdivided into at least two pulsation compartments which are substantially and in particular entirely separate from one another. It is thus possible for the device according to the invention to be employed with a conventional milking unit to thus allow upgrades of existing systems with the invention. Since—unlike conventional liners—the stripping element comprises an inner and an outer wall, the pulsation chamber can be entirely formed in and confined by the suction element.

The apparatus according to the invention may be retrofitted in existing milking systems by way of retrofitting the teat cups including teat cup sleeves.

The specific embodiments and configurations described below can as a rule be employed both in the apparatus according to the invention and in the device according to the invention, unless indicated otherwise in the context.

The apparatus and the device provide for subdividing into different pulsation compartments or subchambers. In this way it is possible to apply in different ways a vacuum or a fluid to the formed pulsation compartments. In this way the collapsing direction of the suction element or the liner can be changed e.g. continually.

Thus the teats of the cows can be maintained in a better milking condition by way of rotary or else alternating massaging. According to the invention, massaging the teats may be provided to vary over time. The prior art, however, does not allow to change the massaging direction on the teat during the milking operation. The present invention allows a changing or varying massage of different teat regions during the milking operation. This offers considerable advantages.

The invention allows prevention of teat flattening which may result from mechanical action on the teats always in the same spots, since the collapsing direction can be changed continually during milking. The fluid may be a gas or a liquid or a liquid-gas mixture. Gases and in particular air are preferably employed. Air is preferably alternatingly fed to and extracted from at least one pulsation chamber of the apparatus. It is also conceivable to employ oil or water or compressed air or another suitable fluid.

A suction element is in particular understood to mean the entire teat liner assembly. The liner may be configured as a single-piece including a short milk hose or a multiple-piece with a separate, short milk hose. The liner may comprise an active portion in periodic contact with the teat of the animal to be milked and a collapsing portion which may be identical with said active portion or may be connected therewith for example through an intermediate portion.

A fluid is applied to the pulsation chamber or the respective pulsation compartments through the associated openings, i.e. in the respective pulsation compartment or the pulsation chamber a specific fluid pressure is generated which fluctuates between a bottom pressure level and a maximum pressure level such that a fluid is in particular periodically extracted from and then fed back into the respective pulsation compartment or the pulsation chamber.

In a preferred embodiment the suction element is arranged in the housing such that the pulsation chamber substantially entirely surrounds the suction element in its peripheral direction. This means that substantially the entire region around the teat in the peripheral direction can be evacuated or filled.

The gap forms the pulsation chamber which, unlike the prior art, is formed of multiple, independent subchambers or pulsation compartments which can be evacuated or filled separately.

Preferably multiple openings are provided at and in particular in the housing which openings are associated to different subchambers or pulsation compartments, i.e. by way of which the fluid can be extracted from or fed to the respective pulsation compartments. In this way the different pulsation compartments can be evacuated or pressurized separately from one another.

Said application to the individual subchambers or pulsation compartments is particularly preferably possible independently from one another such that the fluid can be discharged from the different pulsation compartments at different times during a milking cycle or milking operation.

However, it is also conceivable to provide only one opening in the housing and for example to employ valves in the interior of the housing or the liner to obtain the effect that different pulsation compartments are evacuated at different times. What is also preferred is an opening having an outwardly connection spout and an internal distribution by way of a correspondingly adapted quantity of ducts and valves. The valves may be controlled in particular electrically or mechanically or they may open and close automatically in a predetermined or adjustable rhythm.

Preferably the openings are arranged substantially at the same heights relative to the housing. This means that all of the openings are preferably arranged substantially at the same height in the longitudinal direction of the housing. In this way one can achieve a consistent application of negative pressure on the housing or the pulsation compartments.

The openings are preferably arranged beneath the active portion.

The openings are preferably arranged in the housing substantially evenly spaced substantially in the peripheral direction. In this way it is possible to consistently apply pressure or apply negative pressure to the individual pulsation compartment relative to the teat to be milked.

Preferably the suction element and the housing are arranged substantially coaxial relative to one another. In this way one can achieve that the radial width of the pulsation chamber in the peripheral direction of the suction element remains substantially constant.

Preferably the pulsation chamber is subdivided into the at least two pulsation compartments by means of at least one separator. A separator is understood to mean a means allowing a substantially fluid- or gas-tight separation of the two subchambers relative to one another.

The separator advantageously comprises a substantially fluid-tight wall extending between the suction element and the inner wall of the housing. Said wall substantially extends in the radial direction from the suction element to the inner wall of the housing.

Preferably the wall extends substantially in a longitudinal direction of the housing, and particularly preferably substantially along the entire longitudinal direction of the inner wall of the housing. In this way the pulsation compartments can for one, be separated from one another and for another, extend substantially along the entire longitudinal direction of the housing to thus provide a volume that is still sufficient for suction.

Another preferred embodiment provides multiple separators distributed substantially evenly in the peripheral direction of the housing. In this way one can form substantially equally dimensioned pulsation compartments or pulsation chambers whose volumes are the same size. Preferably precisely one opening in or at the housing is assigned to each of said pulsation compartments. In this way one can apply a vacuum or pressure to a plurality of pulsation compartments through a plurality of openings independently of one another.

Also, there may be provided precisely one opening or one connection for multiple pulsation compartments, e.g. two openings or spouts for four subchambers. In this case, pulsation compartments facing one another may be fed e.g. by means of one opening.

In another preferred embodiment the suction element comprises a cross-section selected from a group of cross-sections including circular cross-sections, ellipsoid cross-sections, multiangular such as triangular, quadrangular, pentagonal, hexagonal, heptagonal, octogonal or polygonal cross-sections and combinations thereof and the like.

In another preferred embodiment a suction device is provided which allows to separately suction off fluid through each opening. For example, valves controlled by means of a control device may apply a vacuum and/or atmosphere to the individual openings independently of one another. In this way it is possible to apply in different ways a fluid at negative pressure and/or a fluid at atmospheric pressure or even positive pressure to different pulsation compartments, during one milking cycle.

The control device particularly preferably causes the fluid to be sucked off or supplied in different ways at a predetermined time through two different openings. This means that for example no suction or feeding of fluid occurs through one opening while the fluid is sucked off or fed through another opening.

It is also conceivable to suck off air from each pulsation compartment at different speeds or to guide air back in at different speeds. To this end, the size of the respective opening cross-section of the individual valves may be adjustable, or individual valves may be controlled clocked to supply or suck off air at a lower rate in that they are periodically switched open and closed for very short periods such as 10, 20 or 100 ms.

The application of pressure or negative pressure to individual subchambers which is different or occurs at different speeds causes the collapsing direction of the liner to continually change during milking.

In the prior art the folding direction of the liner in operation is always the same. At the first use the first folding direction tends to be random in conventional liners. By way of folding, the material will become somewhat tender locally so as to result in a preferred direction into which the conventional liner will then consistently collapse.

In the present invention the control device mentioned above will furthermore preferably cause fluid to be periodically sucked off or supplied through different openings and in this way, fluid or vacuum to be periodically applied to different pulsation compartments.

In a preferred configuration two, three or more pulsation compartments are provided.

In a particularly preferred embodiment the gap or pulsation chamber is subdivided by means of four separators into substantially four subchambers or pulsation compartments of equal size. Said four pulsation compartments may be distributed around the teat to be milked substantially evenly in the peripheral direction. Preferably the control device causes a fluid to be applied substantially in the same way to two opposite pulsation compartments i.e. pulsation compartments opposite one another in the peripheral direction.

For example it is conceivable that vacuum or atmospheric pressure is cyclically applied first to one pulsation compartment and a second pulsation compartment opposite said first pulsation compartment and then to a pulsation compartment adjacent to said first pulsation compartment and a pulsation compartment opposite that.

The inner wall of the housing is preferably provided with receiving apparatuses for receiving the fluid- and in particular gas-tight walls. In this embodiment the walls are connected with the suction element preferably by adhesive force, extending substantially radially outwardly where they are received in said receiving apparatuses.

The present invention is furthermore directed at a method for milking animals in which different fluid pressures are applied at a predetermined time to at least two different, separate pulsation compartments of a pulsation chamber arranged in a housing of a milking apparatus.

Different fluid pressures are preferably applied to the substantially separate subchambers by means of different openings in the housing. It is particularly preferred for equal fluid pressures to be applied to pulsation compartments substantially opposite in the peripheral direction of the housing.

Further advantages and embodiments follow from the embodiment which will now be described with reference to the attached drawings.

BRIEF DESCRIPTION OF THE DRAWINGS

FIG. 1 a transverse sectional view of an apparatus for milking animals according to the invention;

FIG. 2 a top view of a section of a variant of the milking apparatus in FIG. 1, approximately on the line A-A in FIG. 1;

FIG. 3 the illustration of FIG. 2 in a first operating state;

FIG. 4 the illustration of FIG. 2 in a second operating state of the apparatus.

DETAILED DESCRIPTION OF THE PREFERRED EMBODIMENTS

FIG. 1 shows a transverse sectional view of a first apparatus 1 for milking animals according to the invention. This apparatus configured as a teat cup comprises a housing in the shape of a teat cup sleeve 2 in which a suction element configured as a liner 4 is arranged.

The liner 4 comprises a head portion 20 through which by means of an opening 21 the teat of an animal to be milked is inserted. The head portion 20 protrudes beyond the housing in the longitudinal direction L. The teat cup sleeve 2 is presently of metal and is configured substantially extending around the liner 4. Or else, the teat cup sleeve 2 may be of plastic. The liner may e.g. be made of a rubber material or of silicone.

In the present embodiment, four pulsation spouts are provided in the peripheral direction around the teat cup sleeve 2 wherein two pulsation spouts 13a and 13b are visible in the illustration of FIG. 1. Said pulsation spouts open into openings (not shown) in the teat cup sleeve 2 to thus establish a connection to the pulsation chamber of the liner of the teat cup. By way of the pulsation spouts, a fluid is applied to the pulsation chamber 5 or its subchambers 5a, 5b, 5c and 5d of the liner 4. The pulsation spouts 13a, 13b, 13c and 13d, and the pulsation chamber 5 with its pulsation compartments 5a, 5b, 5c and 5d combined form the suction device 15, to which or to whose parts a fluid is periodically fed and then discharged, individually or jointly. In the present embodiment the fluid employed is air. However, another gas or another fluid such as water or oil may be employed as well.

Presently, negative pressure is applied through the pulsation spouts to the pulsation chamber or to the respective pulsation compartments or a fluid or air is discharged from or fed to the pulsation chamber or the respective pulsation compartments. The liner 4 is supported on top of the teat cup sleeve 2 by way of an annular groove 3 and is received at the bottom at the teat cup sleeve.

The liner or suction element 4 comprises a top region 4a or active portion 4a which is in contact with the teat of the animal to be milked at least intermittently. Furthermore, a bottom portion 4b of the liner is provided. The gap or pulsation chamber 5 is formed between the teat cup sleeve 2 or its inner wall 7 on the one hand and the active portion 4a and the bottom portion 4b of the liner 4 on the other hand. The pulsation chamber comprises four pulsation compartments 5a, 5b, 5c and 5d which can be filled up with air or evacuated independently from one another.

More precisely, the pulsation chamber 5 in this embodiment is formed between the inner wall 11 of the portions 4a, 4b of the suction element and a radially outer wall 12 of the liner 4. Said pulsation chamber 5 can be evacuated or ventilated through the openings mentioned above and the pulsation spouts 13a, 13b, 13c and 13d via a valve 31 assigned to each pulsation spout.

The liner 4 in the embodiment according to FIG. 1 comprises a radially inner wall 11 and a radially outer wall 12 between which the pulsation chamber or gap 5 is confined. Four substantially radial walls 8 presently subdivide the entire pulsation chamber 5 into the four subchambers or pulsation compartments 5a, 5b, 5c and 5d, which are gas-tight relative to one another and presently they are substantially the same size.

The reference numeral 17 refers to a suction line or a teat cup insert to suck off and convey the extracted milk.

FIG. 2 shows a top view of a variant of the apparatus for milking animals according to the invention. Like parts or similar components are indicated at the same reference numerals. One can see that the active portion 4a of the liner 4 and the teat cup sleeve 2 of the apparatus are arranged substantially coaxial relative to one another.

In contrast to the embodiment shown in FIG. 1, no outer wall 12 of the liner is provided but the pulsation chamber 5 or the individual, separate pulsation compartments 5a, 5b, 5c and 5d are formed immediately between the inner wall 7 of the teat cup sleeve 2 and the radially inner wall 11 of the liner 4.

In the presently shown embodiment, a total of four gas-tight walls 8 are provided which extend along the longitudinal direction of the liner 4. The substantially gas-tight walls extend substantially radially outwardly, starting from the active portion 4a or the bottom portion 4b of the liner and engage in receiving devices 18 in connection with the teat cup sleeve 2.

As can be seen in FIG. 2, the gas-tight walls 8 are not completely extended in the initial state but as the curvature indicates they can stretch further by a specific range. By means of the four gas-tight walls 8 the pulsation chamber 5 is subdivided into a total of four entirely separate pulsation compartments 5a, 5b, 5c and 5d, wherein the pairs of the pulsation compartments 5a and 5b, and pulsation compartments 5b and 5d are located opposite one another.

All of the pulsation compartments are separate from one another to be substantially gas-tight such that a first subchamber can be evacuated while a second, adjacent subchamber is filled with air at atmospheric pressure. The subchambers or pulsation compartments are sealed from one another at least such that for the length of one phase of a pulsation cycle, no pressure compensation will occur between the two pulsation compartments.

Due to the regular arrangement of the gas-tight walls 8 the four pulsation compartments 5a, 5b, 5c and 5d are substantially the same size.

One opening (not shown) and one pulsation spout 13a, 13b, 13c and 13d each are assigned to each pulsation compartment 5a, 5b, 5c and 5d. In this way the four pulsation compartments 5a to 5d can be ventilated and evacuated separately from one another through the four pulsation spouts 13a to 13d.

Also it is e.g. possible to provide two pulsation spouts only, one pulsation spout being in connection with the two pulsation compartments 5a and 5c and the other pulsation spout, with the two pulsation compartments 5b and 5d. Also, as indicated initially, one pulsation spout only might be provided, the ventilating and evacuating of each of the pulsation compartments 5a to 5d being controlled via a suitable valve control in the interior of the milking apparatus.

FIG. 3 shows a cross-section from FIG. 2 in a first operating state. Air has been taken in through the pulsation spouts 13b and 13d and thus air has been sucked out of the pulsation compartments 5b and 5d, while the pulsation compartments 5a and 5c are ventilated through the pulsation spouts 13a and 13c. Thus, an atmospheric pressure is present in the pulsation compartments 5a and 5c while the operating vacuum is applied to the teat chamber 6. This causes the cross-section of the liner 4 to deform as shown in FIG. 3. The liner folds in due to the positive pressure in the pulsation compartments 5a and 5c. The pulsation compartments 5a and 5c expand while the volumes of the pulsation compartments 5b and 5d are reduced. In the presently shown position the gas-tight walls 8 are stretched.

FIG. 4 shows a cross-section from FIG. 2 in a second operating state. The second operating state is indicated by the solid lines. The broken lines show the first operating state according to FIG. 3. While in the first operating state according to FIG. 3 the opposite pulsation compartments 5a and 5c have been ventilated, the pulsation compartments 5b and 5d which are again opposite one another are ventilated in the second operating state which compartments are arranged rotated 90° in the cross-section plane relative to the two other pulsation compartments. The liner 4 in the illustration in FIG. 4 is folded as well, however in a folding direction perpendicular to the folding direction in the illustration according to FIG. 3.

By way of alternatingly applying air to, or by way of alternatingly sucking air from, the pulsation spouts 13a and 13c on the one hand and the pulsation spouts 13b and 13d on the other hand, the two extreme states shown in FIG. 3 and FIG. 4 can be obtained. In this way the cross-section of the liner changes continually and the teat of the animal to be milked can be massaged from different directions over time. In between, the milk flow path is released in the milking phase of each pulsation cycle in that all of the pulsation compartments are evacuated so as to obtain the state illustrated in the FIGS. 1 and 2.

In place of the four pulsation chambers 5a, 5b and 5c, 5d shown in FIG. 4, multiple pulsation compartments may be provided, preferably with associated openings and pulsation spouts. Thus for example a total of three or five or six or more pulsation compartments might be provided. The quantity of ventilated and non-ventilated pulsation compartments may be different any may be variable over the milking process.

In the case of six pulsation compartments, a vacuum may be applied e.g. to three non-adjacent pulsation compartments during the rest phase of the pulsation cycle at a predetermined time, while atmospheric pressure is maintained in the three other pulsation compartments at the same, predetermined time. Then again, five (or four) pulsation compartments may be ventilated while a subchamber (or two pulsation compartments) remain(s) at an operating vacuum. The one subchamber under vacuum may continually vary around the teat or it may be selected at random for each new cycle to influence the collapsing direction of the liner.

Or else it is conceivable to provide a total of three pulsation compartments only and to apply air to two of them at a pressure different from the third. Or else, in the case of an arrangement of a plurality of pulsation compartments, negative pressure may be applied to each pulsation spout in a random pattern to achieve in this way that the liner deforms at random over time.

Also, the same vacuum might be applied to each pulsation compartment at some times during milking, and different at other times. Additionally, with the embodiment shown in FIG. 4, negative pressure might be applied to one pulsation spout only, thereafter to one adjacent thereto, and this process might continue. In this way the teat might be subjected to a rotary massage.

As can be taken from FIG. 4, the gas-tight, walls 8 are clamped in the region of the pulsation chamber 5 such that in this case there will be four separate compartments. Said compartments are continually, irregularly subjected to a vacuum and atmospheric pressure (or else positive pressure) by means of a pulsator. Generally, as indicated above, not all of the compartments are selected but in the case of three compartments, only two compartments, and in the case of the four compartments shown, only two compartments lying opposite one another.

In the case of more than four compartments it is preferred, as indicated above, to select those compartments opposite one another which will result in an intended collapse of the liner. By way of the adjustable, continual changing of the compartments to be activated the collapsing direction and thus the massaging direction on the teat changes continually.

As indicated above, the present invention achieves an improvement in terms of alternating the massaging direction of the teat tip. In addition, the risk of flattening the teat tips during milking is reduced and the mechanical action on the teat is reduced on the whole. In this way one can on the whole improve udder health and achieve a better teat conditioning. Also, the indicated better teat condition allows higher milk flow intensities during the milking process. The apparatus according to the invention is furthermore suitable to maintain the sensitivity of the teat tip over the entire milking operation and in this way to provide a better basis for stimulating systems related to milking.

Any and all features disclosed in the application documents are claimed as substantial to the invention as far as, individually or in combination, they are new over the prior art.

The invention claimed is:

1. Apparatus for milking animals, the apparatus comprising:
    a housing;
    a liner arranged at least partially inside the housing; and
    a pulsation chamber disposed at least partially between the housing and the liner,
        wherein the pulsation chamber is subdivided into at least four separated pulsation compartments, each of which is separately chargeable with gas to a pressure that is substantially different from a pressure in at least one other adjacent pulsation compartment, and to a pressure that is substantially similar to a pressure in at least one other non-adjacent pulsation compartment, and wherein the pulsation compartments extend in an axial direction of the liner and are arranged in the peripheral direction of the housing.

2. The apparatus according to claim 1, wherein the pulsation chamber defines an annular space substantially surrounding the liner.

3. The apparatus according to claim 1 and further comprising:
    a plurality of openings, wherein each opening is in fluid communication with a corresponding pulsation compartment.

4. The apparatus according to claim 3, wherein the openings are spaced apart substantially evenly.

5. The apparatus according to claim 3, wherein air moves through each opening independently of air moving through other openings.

6. The apparatus according to claim 1, wherein the liner and the housing are arranged substantially coaxially relative to one another.

7. The apparatus according to claim 1, wherein adjacent pulsation compartments are separated by a separator.

8. The apparatus according to claim 7, wherein the separator is arranged in a substantially longitudinal direction relative to the housing.

9. The apparatus according to claim 7, wherein the separator is a substantially gas-tight wall extending between the liner and the housing.

10. The apparatus according to claim 9, wherein the gas-tight wall is disposed in a receiving apparatus joined to an inner surface of the housing.

11. The apparatus according to claim 1, and further comprising:
    a plurality of pulsation spouts, and each pulsation spout is in fluid communication with a corresponding pulsation compartment.

12. The apparatus according to claim 1, and further comprising:
    at least four separators spaced apart from each other to subdivide the pulsation chamber into at least four pulsation compartments.

13. The apparatus according to claim 1, and further comprising:
    a pulsation control device in fluid communication with the pulsation chamber.

14. The apparatus according to claim 13, wherein the pulsation control device withdraws air through openings in each pulsation compartment at predetermined intervals.

15. The apparatus according to claim 13, wherein the pulsation control device provides air to each of the pulsation compartments in a substantially similar volume.

16. The apparatus according to claim 1, wherein the pulsation compartments each define an opening in fluid communication with a pulsation spout.

17. The apparatus according to claim 1, and further comprising:
    a first valve for communicating with the first pulsation chamber.

18. The apparatus according to claim 17, wherein the valve is automatically controllable.

19. A device for milking animals, the device comprising:
    a teat cup;
    a teat cup liner disposed at least partially in the teat cup; and
    a pulsation chamber defined at least partially by the teat cup liner and the teat cup;
        wherein the pulsation chamber is subdivided into at least four separated pulsation compartments, and each pulsation compartment is separately chargeable with gas at a substantially different pressure from at least one other adjacent pulsation compartment, and at a substantially similar gas pressure to at least one other non-adjacent pulsation compartment, and wherein the pulsation compartments extend in an axial direction of the liner and are arranged in the peripheral direction of the housing.

20. The device according to claim 19, wherein the pulsation chamber is subdivided into a plurality of pulsation compartments by a substantially radially oriented separator.

21. The device according to claim 19, and further comprising: a valve disposed between the compartments.

22. A method for milking animals with an apparatus including:
- a housing;
- a liner arranged at least partially inside the housing; and
- a pulsation chamber disposed at least partially between the housing and the liner; and
- wherein the pulsation chamber is subdivided into at least four pulsation compartments wherein the pulsation compartments extend in a longitudinal direction of the liner and are arranged in the peripheral direction of the housing, and the method comprising the step of:
- applying a gas pressure to one pulsation compartment that is substantially different from a gas pressure in at least one adjacent pulsation compartment and is substantially similar to a gas pressure in at least one other non-adjacent pulsation compartment.

23. The method according to claim 22, wherein the step of applying different gas pressures to the pulsation compartments comprises:
- providing gas through different openings in the housing.

24. The method according to claim 22, wherein the step of applying different gas pressures comprises the step of:
- applying substantially similar gas pressures to pulsation compartments that are disposed substantially opposite one another in a peripheral direction of the housing.

25. Apparatus for milking animals, the apparatus comprising:
- a housing;
- a liner disposed at least partially inside the housing;
- a pulsation chamber disposed at least partially between the housing and liner, and subdivided into at least four gas-tight compartments extending in an axial direction of the liner and arranged in a peripheral direction of the housing; and
- a plurality of pulsation spouts, each in fluid communication with a corresponding gas-tight compartment to supply fluid to the compartment at a pressure that is substantially different from a pressure supplied to at least one other adjacent gas-tight compartment, and that is substantially the same as a pressure supplied to at least one other non-adjacent gas-tight compartment.

26. Apparatus for milking animals, the apparatus comprising:
- a housing;
- a liner disposed at least partially inside the housing;
- a pulsation chamber disposed at least partially between the housing and liner, and subdivided into a first non-adjacent pair and a second non-adjacent pair of gas-tight compartments, and the pairs of non-adjacent compartments extend in an axial direction of the liner and are arranged in a peripheral direction of the housing; and
- a first pulsation spout connected with the first pair of non-adjacent pulsation compartments to charge the first pair of non-adjacent compartments to a substantially similar gas pressure, and a second pulsation spout connected with the second pair of pulsation compartments to charge the second pair of non-adjacent compartments to a gas pressure that is substantially different than the gas pressure in the first non-adjacent pair of compartments.

* * * * *